(No Model.)
W. R. PATTERSON.
METHOD OF TESTING ELECTRIC CABLES.
No. 330,048. Patented Nov. 10, 1885.
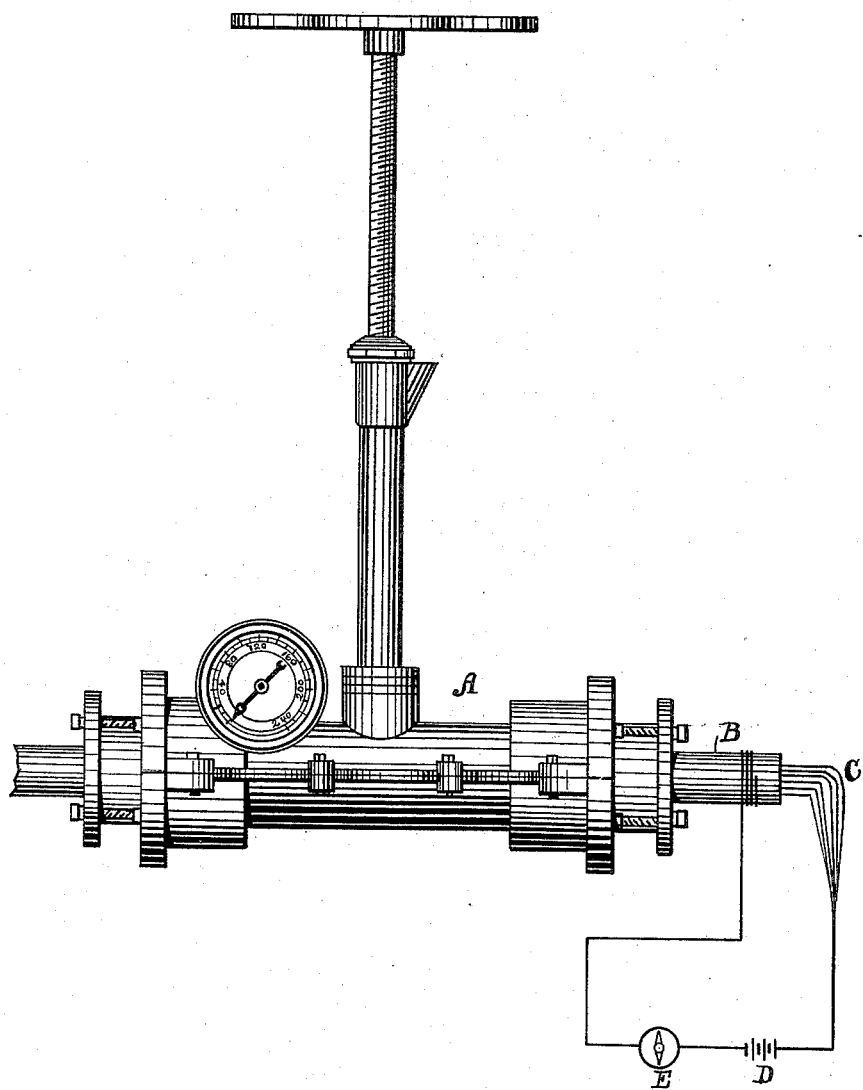

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

METHOD OF TESTING ELECTRIC CABLES.

SPECIFICATION forming part of Letters Patent No. 330,048, dated November 10, 1885.

Application filed March 22, 1884. Serial No. 125,220. (No model.)

*To all whom it may concern:*

Be it known that I, WILLIAM R. PATTERSON, a citizen of the United States, residing at Chicago, in the county of Cook and State of Illinois, have invented a certain new and useful Improvement in Methods of Testing Electric Cables, of which the following is a full, clear, concise, and exact description, reference being had to the accompanying drawing, forming a part of this specification.

My invention relates to telegraph-cables, which consist of a core of conductors drawn within lead pipe, the interstices between the pipe and the core being filled with paraffine. The core of conductors may be a thousand feet or more in length, without splice or joint, while the pipe must be in sections of, say, one hundred feet each in length. The core is drawn into the pipe and the joints are then wiped. By means of my apparatus described in my Patent No. 284,226, granted September 4, 1883, the melted paraffine is then forced into the pipe about the core. The pressure of the melted paraffine charged with gas is sufficient to test the wipe-joints of the pipe. If, however, a defective joint be found, it is necessary to wipe it again after the cable has cooled. The joint then must be tested again to guard against the possibility of a leak. In laying cables also, it is often necessary to make splices, and the joints of the pipe at such splices must be wiped and tested.

My invention herein consists in a new method of testing the joints of the pipe of telegraph-cables, and is especially designed to be used where a joint has been found defective and rewiped, and where joints are made in laying cable and under circumstances where it is inconvenient or impracticable to obtain internal pressure.

I have devised a hydrostatic press for the purpose of applying my method. This press forms the subject-matter of another application for United States Letters Patent, and is therefore disclaimed herein, except when used in my process or method of testing the joints of telegraph-cables, as herein described.

My method consists more particularly in bunching the conductors of the core to a wire which is connected through a battery and galvanometer to the pipe of the cable, and applying hydrostatic pressure to the joint to be tested, and while observing the galvanometer gradually raising the temperature of the water about the joint from, say, 40° Fahrenheit to about the melting-point of paraffine or the other insulating material, say about 150° Fahrenheit. If the joint is defective, water or moisture will be forced through the joint to the conductors of the cable. The circuit of the battery and galvanometer will thus be closed at the joint between the pipe and the conductors by the moisture thus forced through the defective joint. The pressure applied is so great and the galvanometer so sensitive that the slightest imperfection in the joint may thus be readily detected.

In the accompanying drawing I have shown apparatus adapted to be used in the practical application of my method of testing the joints of telegraph-cables. The hydrostatic press A is shown placed about the pipe B of the cable. The conductors C of the cable are at one end bunched together, as shown, and connected through a battery, D, and galvanometer E to the pipe. The joint to be tested is inclosed within the cylinder of the hydrostatic press and cannot be seen in the drawing. The water surrounds the joint. By turning the handle of the press the water may be pressed against the joint with great force. I preferably attach a gage to the press to measure the amount of pressure. If, now, when pressure is thus applied to the joint any moisture is forced through to the conductors the fact will be indicated by the galvanometer E, which will be turned more or less, according to the amount of moisture forced in.

Gutta-percha cables have been heretofore tested by running them through a trough filled with water, and at the same time observing a galvanometer connected in circuit with a battery at one end of the conductors. Ocean cables are usually coiled in large tanks of water for testing. I have found, however, that these old methods of testing are not sufficient for my cables, since the paraffine may fill an opening in a defective joint and keep water from penetrating to the wires for a long time. I have found it necessary, in order to test my cable at any particular point from the outside, to apply great hydrostatic pressure. I have also found it better to have the water in the press quite cold, or at a temperature approaching the melting-point of paraffine. I therefore prefer to have the temperature of the water in the press, say, from 32° Fahrenheit to 40°, or between 100° Fahrenheit and 150°. If the water is quite cold, the lead pipe and paraffine shrink, thus making the defect or opening in the joint larger. On the other hand, if the water in the press is warm enough to slightly soften the paraffine, it will offer less resistance to the pressure of the water, so that the water or moisture may be more easily forced through a flaw in a joint, although the lead has been slightly expanded. At a temperature ranging from about 40° Fahrenheit to about 100° I find that more pressure is required to test a joint than when the temperature of the water is outside these limits, as above described.

I do not limit myself to any particular apparatus for producing hydrostatic pressure about the joint to be tested. It is evident, also, that the galvanometer may be connected with the conductors in different ways; and I therefore do not limit my invention to the specific manner herein described and shown.

As to the state of the art prior to my invention, reference is made to the following English patents: No. 2,997 of 1858, (pages 20 and 21,) No. 1,023 of 1853, and No. 1,234 of 1864.

What I claim as new, and desire to secure by Letters Patent, is—

The method of testing the joints of the lead pipe of telegraph-cables, which consists in pressing water about the joint and gradually increasing the temperature of the water, and at the same time observing a galvanometer included in the circuit of the wires of the cable, substantially as and for the purpose specified.

In witness whereof I hereunto subscribe my name this 18th day of March, A. D. 1884.

WILLIAM R. PATTERSON.

Witnesses:
GEORGE P. BARTON,
C. C. SHEPHERD.